Nov. 20, 1962　　　　　　G. S. KNOX　　　　　　3,064,938
VALVE HAVING A DEFORMABLE SEALING MEANS
Filed July 1, 1960　　　　　　　　　　　　　　6 Sheets-Sheet 1

GRANVILLE S. KNOX
INVENTOR.

BY *White H Haeflich*

ATTORNEYS

Nov. 20, 1962 G. S. KNOX 3,064,938
VALVE HAVING A DEFORMABLE SEALING MEANS
Filed July 1, 1960 6 Sheets-Sheet 3

GRANVILLE S. KNOX
INVENTOR.

BY *Whiter Haufler*

ATTORNEYS

GRANVILLE S. KNOX
INVENTOR.

BY *White & Haefliger*

ATTORNEY

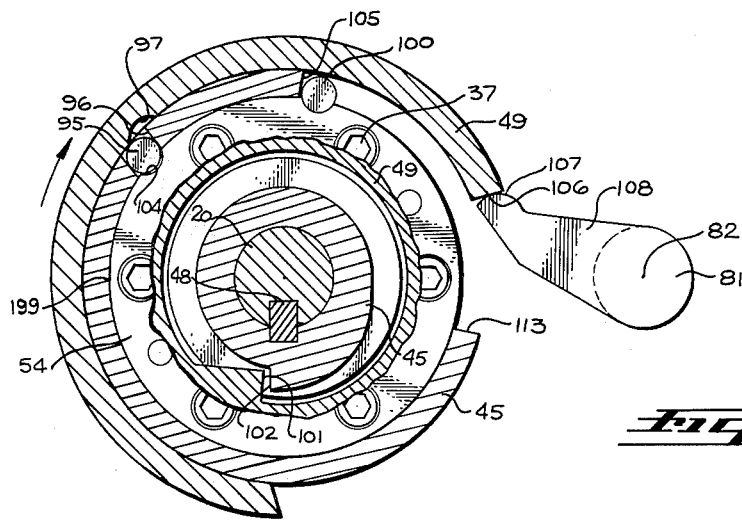
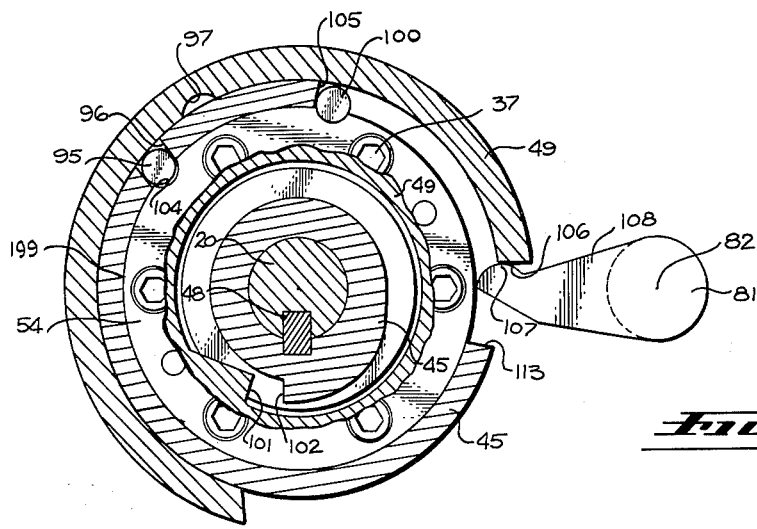

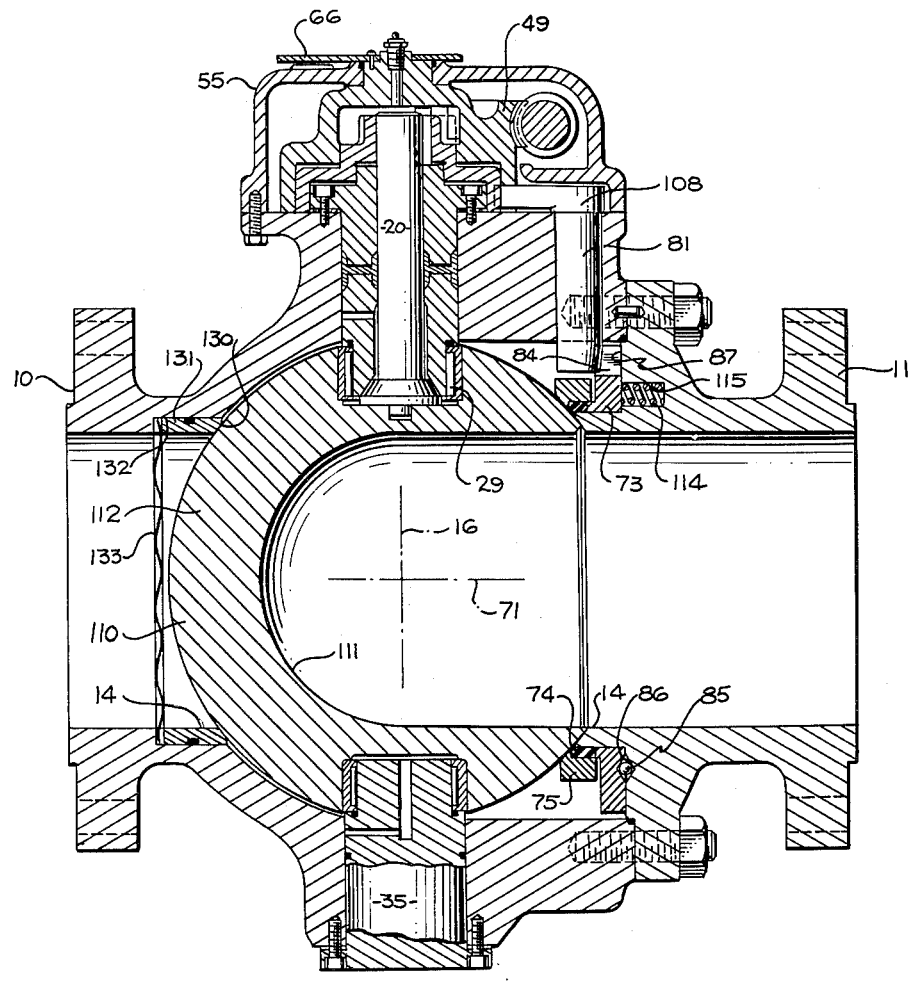
Fig. II

United States Patent Office 3,064,938
Patented Nov. 20, 1962

3,064,938
VALVE HAVING A DEFORMABLE SEALING MEANS
Granville S. Knox, Glendale, Calif., assignor to Hydril Company, Los Angeles, Calif., a corporation of Ohio
Filed July 1, 1960, Ser. No. 40,269
11 Claims. (Cl. 251—171)

This invention relates generally to the art having to do with valves, and more particularly concerns improvements in ball stopper valves of the type wherein a positive, enduring, bubble tight and seep-proof seal against high pressure gases and liquids, under unusually severe operating conditions, is effected between the stopper and the valve body only after the stopper is moved into a position wherein the stopper blanks a valve body port.

The present invention represents an improvement over my prior U.S. Patent No. 2,734,715, entitled "Spherical Valve." In that patent there was disclosed a positive sealing valve having a hand wheel shaft or control stem which upon continuous clockwise rotation caused the valve stopper to rotate to the closed position and then caused a plastic packing to be compressed between the stopper and the valve body, it being a limiting characteristic of the particular structure disclosed that the gear ratio providing mechanical advantage could be no greater than approximately 3.9 to 1. This limiting feature resulted from the operating characteristics of the particular coupling mechanism which required that the hand wheel shaft be decoupled from the stopper rotating part after the stopper had been rotated approximately 90° and before the hand wheel shaft had been rotated more than approximately 350°. (350/90=3.89=maximum allowable gear ratio).

The present invention has for one of its major objects the provision of improved actuating means for moving the stopper to and from a position in which the stopper blanks one of the valve chamber ports, and then thrusting the sealing means into pressure sealing engagement with the stopper and the valve chamber, characterized in that the gear ratio providing mechanical advantage for turning the stopper in response to turning of the hand wheel is enabled to be much greater than 3.9 to 1, an example of the increased gear ratio being a ratio of 60 to 1. This is of particular advantage in many applications of the invention, as for example in those instances where the stopper might become stuck in open or closed condition after long periods of use in that configuration without turning.

This general object is realized in accordance with the invention through the provision of improved actuating means which includes driving and driven rotary parts through which force is transmissible with mechanical advantage from the driving to the driven parts, the actuating means including coupling means for coupling two driven parts to rotate together during the stopper movement to a position in which the stopper blanks one part, and operable to decouple the two driven parts in response to continued force transmission to one of the two driven parts after the stopper arrives at that position. Accordingly, after decoupling of the two driven parts, which are associated with the stopper rather than the hand wheel, the actuating means including the driving rotary part is then operable to transmit thrust for bodily moving the sealing means into pressure sealing engagement with the stopper and the valve chamber, this being accomplished while the stopper does not rotate. Therefore, the seal cannot be damaged as by accidental pressurization thereof while the stopper is in any position other than the position in which it blanks the one port.

It is another major object of the invention to provide a novel assembly including an annulus of packing material for sealing off between the stopper and annular face extent of the valve chamber, whereby the packing annulus or seal is confined against pressural extrusion from a packing channel when the packing annulus is thrust into pressure sealing engagement with the stopper. According to the invention the novel assembly includes broadly a rigid ring mounted on the packing annulus and projecting between a portion of the packing and the stopper so as to be carried by the packing into engagement with the stopper surface in response to thrust exertion against the packing by an annular thrust member. Such mounting of the packing confining ring on the packing annulus so as to be carried thereby during bodily movement of the annulus toward the stopper, achieves the benefits of reducing to a minimum the clearances between the confining ring and the ball stopper when the packing is pressurized into sealing engagement with the stopper, whereby the packing cannot extrude between the ring and the stopper through the clearances.

A further object of the invention is to provide for minimizing leakage between the ball stopper and the valve chamber, and particularly past the annular seal packing, which would otherwise occur to some extent during the times when the packing is not pressurized by the actuating means. This purpose is served through the provision of spring means transmitting thrust acting continuously upon and through the annular thrust member which is part of the actuating means, to urge the sealing means into relatively light pressural engagement with the stopper at all times, even during turning of the stopper. This spring force is, however, not so great as to interfere to any considerable extent with turning of the stopper. In any event, the rather high mechanical advantage afforded by the rotary parts through which force is transmissible from the hand wheel to the stopper, is sufficient to permit easy turning of the stopper under all conditions.

A still further object of the invention is to prevent axial shifting of the stopper and resultant binding of the stopper against the chamber wall which would prevent proper turning of the stopper, this object being served by affording equalization of pressure exerted gainst the stopper and axially oppositely with respect to the stopper axis of rotation, passages being provided to communicate between the trunnion bores in the valve chamber and trunnion receiving recesses formed in the stopper, for communicating the equalizing pressure to the recesses.

These and other objects and advantages of the invention, as well as the details of an illustrative embodiment, will be more fully understood from the following detailed description of the drawings, in which:

FIG. 6 is a view similar to FIG. 4 showing the relative positions of the valve actuating means just after the FIG. 1 stopper has been rotated to fully closed position, but before the sealing means is pressurized to seal against the stopper;

FIG. 7 is a view similar to FIG. 6 but showing the valve actuating means when the valve stopper is completely closed and the sealing ring pressurized;

FIG. 11 is a view of a slightly modified valve similar in most respects to FIG. 1.

Figure 1:
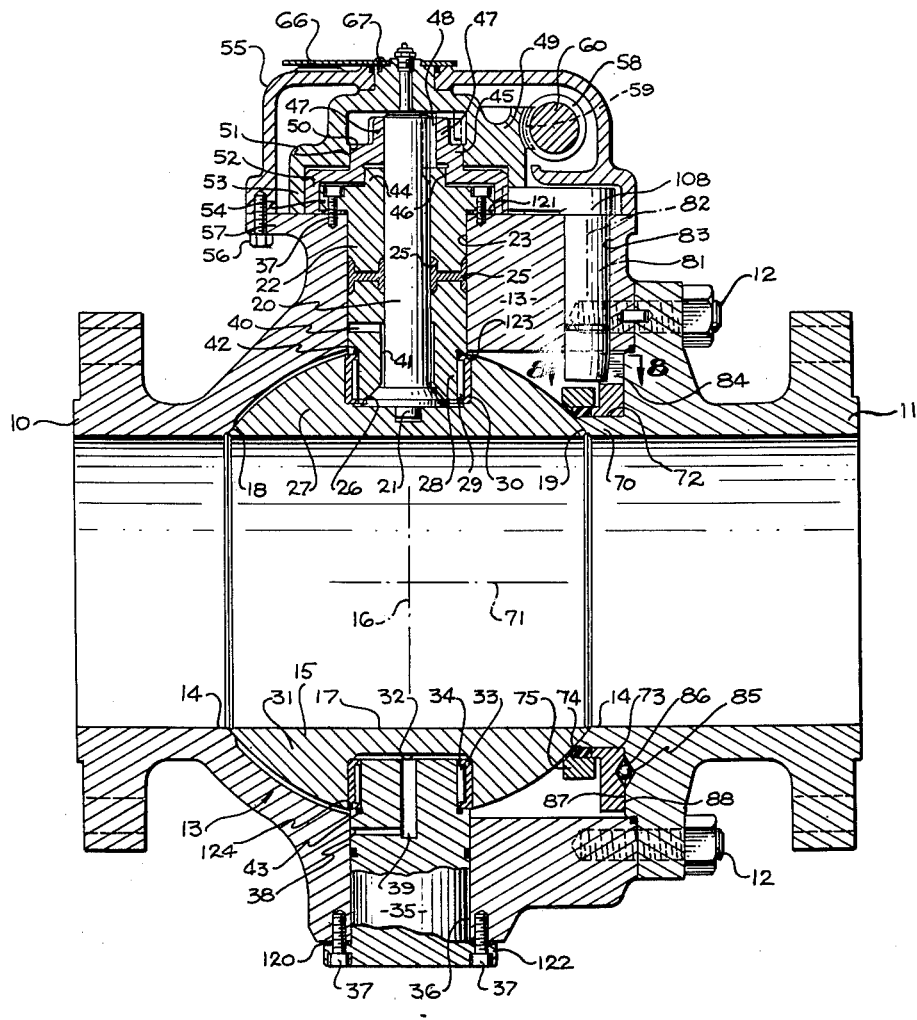
FIG. 1 is a vertical section taken through a preferred form of the valve.
Figure 2:
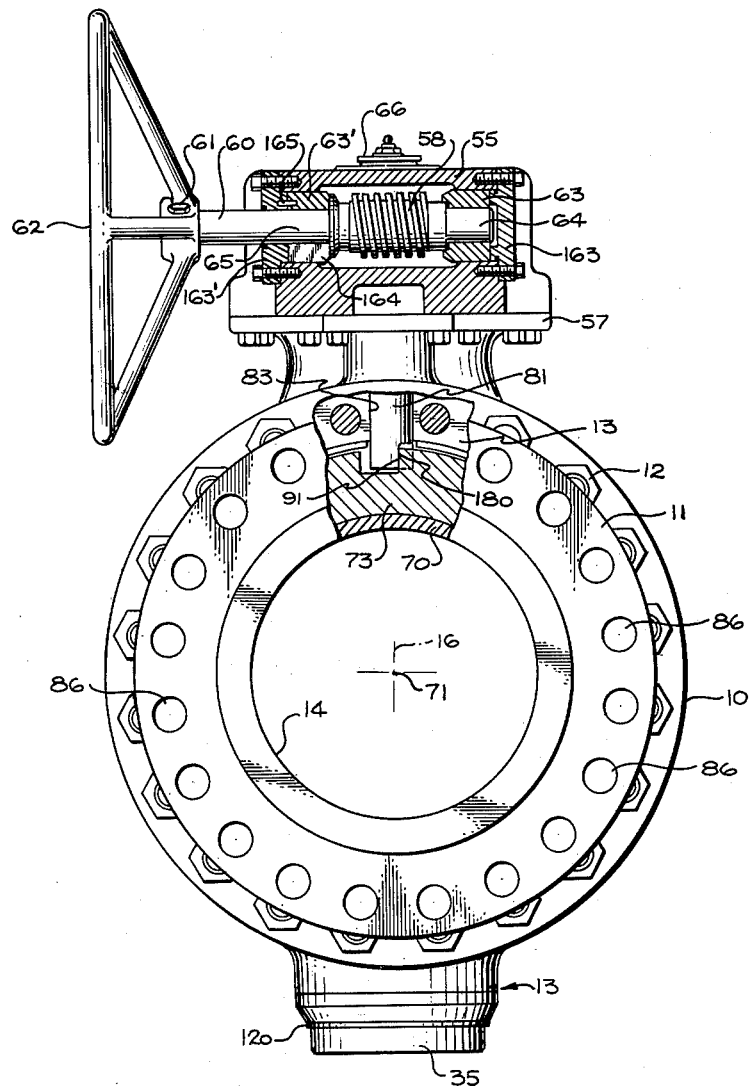
FIG. 2 is a vertical section through the FIG. 1 valve taken at right angles thereto.
Figure 3:
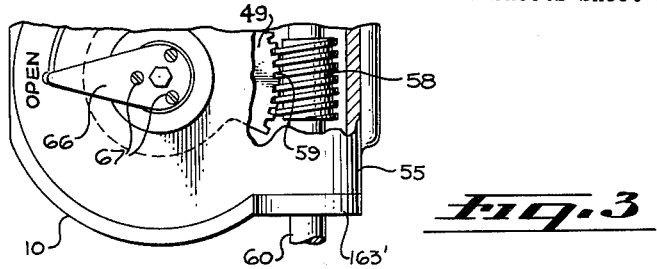
FIG. 3 is a fragmentary plan view partly broken away, showing the top of the valve assembly.

Referring first to FIGS. 1 through 3, the valve unit includes a flanged body 10 and a flanged body cap 11 connected by stud bolts 12, forming a valve chamber 13 having coaxial inlet and outlet ports 14. A valve stopper 15 in the general form of a spherical plug is located in the chamber 13 for rotation therein about a vertical axis 16. Such rotation through ninety degrees carries a horizontal passage 17 through the stopper into and out of registration with the horizontal passage 14 for controlling fluid flow through the valve.

In general, there is slight clearance between the stopper surface and the spherical concave surfaces 18 and 19 of the valve chamber, so that the stopper may be readily turned within the chamber by rotation of the vertical spindle 20 to which the stopper is keyed at 21. The spindle 20 is centered with respect to axis 16 by a trunnion 22 or bushing received within a vertical bore 23 in body 10, the trunnion 22 containing a pair of annular recesses 25 sealed with plastic packing injected under pressure to seal off between the trunnion and the spindle and also between the trunnion and the bore 23.

The trunnion 22 projects into a recess 26 sunk into the stopper solid side 27 coaxially of the axis 16, with a reduced diameter portion 28 of the trunnion in engagement with needle bearings 29 carried by bearing race 30. The race is fitted into the recess 26 so that it turns with the stopper. Likewise, at the opposite solid side 31 of the stopper, a recess 32 sunk therein receives a race 33 for needle bearings 34 which provide anti-friction bearings for stopper rotation about a fixed trunnion 35, the terminal end of which fits into the recess. Trunnion 35 is received within a bore 36 in the body 10, and both trunnions 22 and 35 are connected to the chamber as by cap screws 37.

Shims 120 and 121 are provided between flanges 122 and 54 and body 10 so that the stopper 15 can be shifted vertically along axis 16 by engagement of trunnion shoulder 123 and 124 with races 30 and 33 in order that the stopper may be centered with respect to chamber surfaces 18 and 19.

Trunnion 35 contains series connected passages 38 and 39 which respectively communicate with the bore 36 and with the stopper face of the recess 32, and likewise trunnion 22 contains series connected passage 40 and clearance 41, the latter existing between the trunnion 22 and the spindle 20. Passage 40 communicates with the bore 23 while clearance 41 communicates with the stopper face of the recess 26. The passages 38 and 39, 40 and the clearance 41 are filled with grease or other highly viscous liquid which not only serves to lubricate the needle bearings 29 and 34 but also serves as a barrier between the fluid in the chamber 13 and the recesses 26 and 32. The pressure of the fluid in the chamber 13 is, generally speaking, communicated through restricted annular clearances to the bores 23 and 36 and then to the barrier grease within the aforementioned passages, whereby such pressure is exerted equally and oppositely against the stopper faces of the recesses 26 and 32. Accordingly, such pressure equalization prevents the valve stopper 15 from being forced in either axial direction along axis 16, which would otherwise tend to make turning of the stopped difficult by reason of one bearing race being thrust hard against one of the trunnion shoulders. O-ring seals 42 and 43 are shown sealing off between the trunnion shoulders and at the outer ends of the races 30 and 33.

The trunnion 22 includes an upwardly projecting circular boss 44 upon which an annular part 45 is mounted for rotation. This part contains a bore 46 receiving the boss 44, and a portion 47 of this past extending over the boss 44 is keyed at 48 to the upper end of the spindle 20. Accordingly, part 45 which will be referred to as the other or second driven part, rotates with the stopper about axis 16.

An annular worm gear member 49 which will be referred to as the one driven part, is in turn coaxially mounted on part 45, part 49 having a bore 50 which receives an annular shoulder 51 on part 45. The parts 45 and 49 furthermore have inner and outer skirt portions 52 and 53, respectively, which extend concentrically about flange 54 on trunnion 22.

The above mentioned parts 45 and 49 are contained within a housing 55 connected by cap screws 56 to the flange 57 of valve body 10. Also projecting into the housing 55 is a driving worm part 58 which meshes at 59 with the peripheral teeth on the one driven worm gear part 49, thereby forming a worm gear drive. The worm 58 is formed on a shaft 60 better seen in FIG. 2 to be connected at 61 to an external hand wheel 62, suitable journals 63 and 63' being retained within the housing 55 by closure caps 163 and 163' for supporting the shaft bearing portions 64 and 65. Journal 63', which contains a radial split at 164 and is keyed to closure cap 163' at 165, is bored to have a light interference fit with bearing portion 65. The interference fit provides a light drag or brake sufficient to hold the worm in the position to which it has been moved by the hand wheel.

Upon rotation of the hand wheel 62, torque is transmitted with very high mechanical advantage from the driving part 58 to the one driven part 49 and under certain conditions as will be described, such rotation is also transmitted to the other driven part 45 which is connected to the spindle 20 for rotating the stopper. When the one driven part 49 is being rotated about axis 16, a marker 66 attached by screws 67 to the top portion of part 49 is rotated to signify the rotary position of the stopper within the chamber 13. This marker is better shown in FIG. 3.

Figures 9, 10:
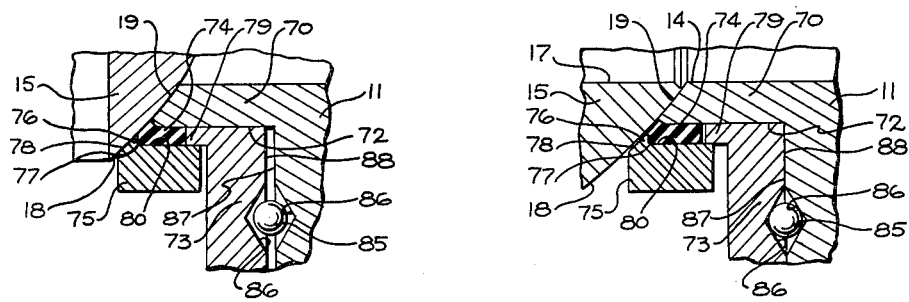
FIG. 9 is an enlarged showing of the sealing means of FIG. 1, and the structure confining it before bodily displacement of the seal into pressural engagement with the ball stopper.
FIG. 10 is a view similar to FIG. 9 showing the seal bodily displaced into pressure engagement with the stopper.

Referring to FIGS. 1, 2 and 8 through 10, the chamber 13 and particularly the cap 11, is shown to include an annular boss 70 extending coaxially about the horizontal axis 71 of the valve, and projecting toward the stopper 15, the terminal end of the boss comprising the annular surface 19. Mounted on the annular face extent 72 of the boss 70 are annular thrust member 73 and an annulus 74 of packing material for sealing off between the face 72 and the stopper 15 when the latter is rotated into position blanking the port 14, as seen in FIG. 10. The packing annulus may comprise a material known as Teflon, which is the trade name for polymerized tetrafluoroethylene; or if temperature conditions are extremely high, a preformed packing annulus of asbestos material may be used. The packing annulus is required to seal between face 72 and stopper 15 only when compressed by thrust member 73, and therefore does not necessarily need to be molded into a continuous ring and the material need not be resilient.

Spaced radially outwardly from the boss 70 is a metallic ring 75, which is mounted on the annulus 74 and projects at 76 between a shoulder portion 77 of the packing and stopper 15, the ring 75 having a terminal annular surface 78 which is spherically concave to seat squarely against the stopper surface. As shown in FIG. 9 the surface 78 may be spaced slightly from the stopper surface to allow stopper rotation without interference.

The thrust ring 73 has an annular portion 79 which projects between the ring 75 and the boss 70 and into the channel 80 occupied by the packing annulus 74, the packing being confined within the channel by the boss 70, the ring 75, the thrust member tongue portion 79 and the stopper 15. When the thrust member 73 is simultaneously rotated about the boss 70 and displaced bodily toward the packing 74, it transmits thrust acting to press the packing annulus against the stopper 15, the ring portion 76 and the boss face extent 72, whereby a seal is effected as is illustrated in FIG. 10. Such bodily displacement of the packing 74 into pressural engagement with the stopper 15 serves to carry the ring 75 bodily with the packing into engagement with the stopper surface as seen in FIG. 10 thereby eliminating the clearance between ring surface 78 and the stopper surface which shows up in FIG. 9, insuring against outward pressural extrusion of the packing between the ring 75 and the stopper.

Figure 8:
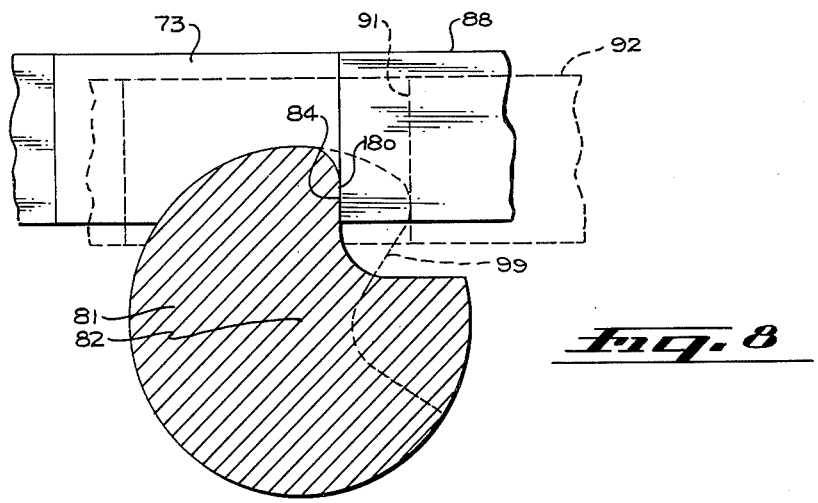
FIG. 8 is an enlarged section taken on line 8—8 of FIG. 1.

The thrust member 73 is simultaneously rotated about the boss 70 and displaced axially along the boss 70, as described above, by the actuating cam mechanism which will now be described with reference to FIGS. 1, 2 and 8 through 10. Rotation is transmitted to the thrust ring by rotary movement of a vertical cam shoulder 180 on a cam shaft 81 which is rotated about its vertical axis 82 in response to movement of the one driven part 49. The cam shaft 81 is received within a vertical bore 83 in valve body 10, with the portion of the cam shaft carrying the shoulder 180 projecting downwardly into overlapping relation with the thrust member 73. More particularly, the cam shaft shoulder 180 engages a vertical shoulder 84 of the thrust member as best seen in FIG. 8, so that upon rotation of the cam shaft, the thrust ring rotates about the boss 70.

This rotary movement of the thrust ring is accompanied by axially bodily displacement thereof along axis 71 as a result of the camming action of a plurality of balls 85 carried in opposite conical recesses 86 circularly spaced about axis 71 and formed in opposite faces 87 and 88 of the body cap 11 and thrust member 73, respectively. As seen in FIG. 9, prior to rotation of the cam shaft 82 the balls are centered in the recesses 86 so that the thrust ring is in an axial position close to the face 87 on the body cap 11. However, as the cam shaft 81 is rotated, for example to the shoulder position as indicated by the broken line 99 in FIG. 8, the balls 85, which are in the path of thrust member rotation and which engage the walls of the recesses 86 angled in the direction of thrust ring rotation and axial advancement toward the packing annulus, roll up the inclined recess walls substantially without friction to displace the thrust member 73 axially toward the packing annulus 74, as seen in FIG. 10. As seen in FIG. 8, the broken line 91 indicates the displaced or rotated position of the thrust member shoulder 84, and the broken line 92 indicates the axially displaced thrust member face 88.

Figure 4:
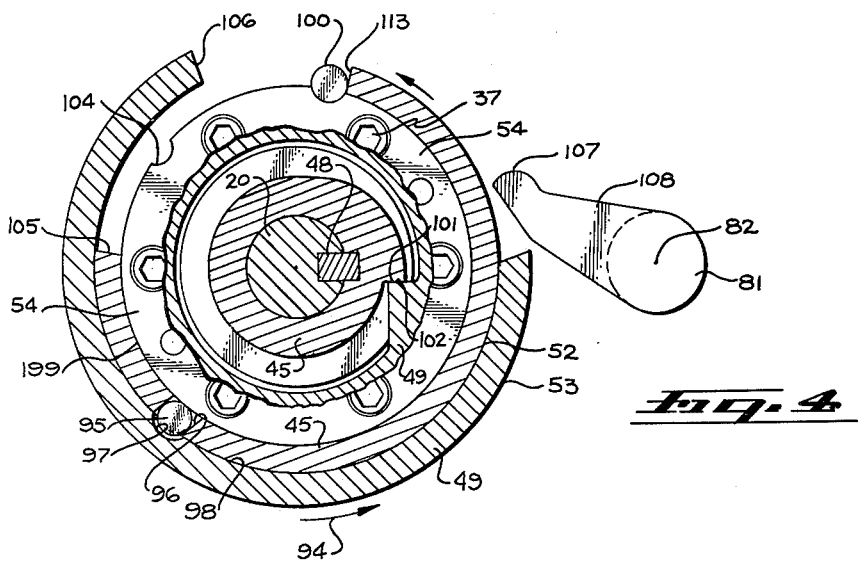
FIG. 4 is an enlarged horizontal section taken through the valve actuating means with the FIG. 1 valve stopper in open position.

Referring now to FIG. 4, the actuating elements or parts are shown at a time when the FIG. 1 stopper is open, with the driven part 49 turned counter-clockwise into tightened condition as indicated by the arrow 94. Counter-clockwise rotation of part 45 is then blocked by engagement of end face 113 thereof with stop pin 100. Furthermore, counter-clockwise movement of the driven part 49 relative to part 45 is blocked by radial clutch shoulder 101 on driven part 49 engaging radial shoulder 102 on driven part 45.

Figure 5:
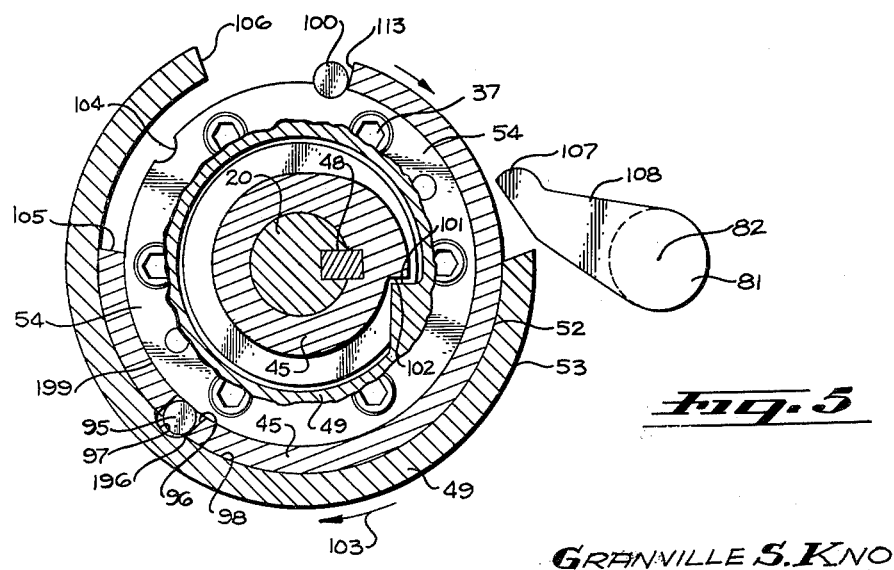
FIG. 5 is a view similar to FIG. 4 showing the initial operation of the valve actuating means at the beginning of valve closing movement.

FIG. 5 shows the same parts as illustrated in FIG. 4, shortly after the hand wheel is actuated to initially displace the driven part 49 in the direction of clockwise arrow 103. Under these conditions the shoulders 101 and 102 are disengaged and the driven part 49 carries the driven part 45 clockwise by virtue of the coupling afforded by a clutch roller 95 engaged at 196 by a notch cut portion 97 of member 49. The roller 95 is blocked against radially inward displacement by engagement with the periphery 199 of the trunnion flange 54. Therefore, since the stopper is effectively keyed to driven part 45, it may be rotated through ninety degrees to the position shown in FIG. 6.

At this time the clutch roller 95 comes opposite a concave notch 104 cut in the periphery 199 of the trunnion head 54, and further rotation of the driven part 49 effects camming of the roller 95 into the notch 104 thereby decoupling the driven part 49 from the driven part 45. Therefore, the stopper is not rotated further than one-quarter turn to closed position, and yet the driven part 49 is free to rotate to effect actuation or pressurization of the seal against the stopper. FIG. 6 also shows the terminal end 105 of the driven part 45 in engagement with the stop 100, which positively prevents further than one-quarter turn rotation of the stopper.

The terminal end 106 of the one driven part 49 is shown in FIG. 6 coming into engagement with the end portion 107 of a lever 108. The latter is integral with the cam shaft 81 and therefore rotates the cam shaft when the lever is pivoted about the cam shaft axis 82 in response to continued forward rotation of the one driven part 49 to the position shown in FIG. 7. Accordingly, it is readily seen that actuation of the seal into pressural engagement with the stopper cannot occur until after the stopper has been turned into position for blocking the port 14. Reverse rotation of the one driven part 49 in response to reverse rotation of the external hand wheel 62 carries the one driven part 49 counter-clockwise to relieve the lever 108, thereby relieving the pressural engagement of the seal with the stopper as previously explained. As part 49 continues to rotate counter-clockwise, clutch shoulder 101 on part 49 engages shoulder 102 on part 45 and both parts then rotate together. The concave notch 97 in part 49 is not opposite the clutch roller 95, the latter is cammed into notch 97 and the driven parts 49 and 45 rotate together to carry the stopper to the open position, the culmination of these counter-clockwise movements corresponding to the position of the mechanism shown in FIG. 4.

While certain specific forms of driving and driven parts 58, 45 and 49 have been discussed in detail, it will be understood that these parts may take other forms which perform the same or equivalent functions to accomplish the objects of the invention.

Referring finally to FIG. 11, the principal modifications consist in the use of a stopper 110 having a pocket 111 formed therein which openly registers with one or the other of ports 14 depending upon the rotary position of the stopper about axis 16. This type valve is suitable for transferring solids or liquids from one side of the valve to the other without leakage of fluid pressure through the valve.

Accordingly, it will be clear that the stopper may be rotated one-half turn or one hundred eighty degrees, so as to rotate the solid side 112 of the stopper to or from a position in which the stopper blanks one or the other of the ports 14. The only change necessary in the mechanism for rotating the stopper would be the positioning of roller 95, radial slot 96 and notch 97 with respect to notch 104 and stop 100 and the positioning of terminal ends 105 and 106. In other words, instead of there being an approximate ninety degree interval between the shoulders 105 and 113 on the driven part 45, it is necessary that there be an approximate one hundred eighty degree interval between these shoulders, and that part 49 be able to rotate approximately 180 degrees before terminal end 106 engages end portion 107 of lever 108.

Finally, spring means shown in FIG. 11 is shown at 114 for transmitting thrust acting upon or through the thrust member 73 to urge the packing annulus into relatively light pressural engagement with the stopper surface at all times. This minimizes leakage between the stopper and the chamber during certain angular positions of the stopper. The compression springs 114 will be understood to be received within bores 115 sunk into the wall 87 in the cap 11 and spaced at circular intervals about the axis 71, intermediate the balls 85 and recesses 86. FIG. 11 also shows an auxiliary annular seat 130 formed on an annular insert 131 receivable in a counterbore 132 in body 10. An annular spring such as a marcel spring 133 also received in the counterbore 132 urges the insert toward the stopper so that seat 130 seals off against the stopper surface during certain angular positions thereof and particularly while main valve seal 74 is uncovered by the pocket 111 in the valve stopper.

While I have illustrated and described preferred embodiments of my invention, various changes in design, structure and arrangement may be made without departing from the spirit and scope of the appended claims.

I claim:

1. An improved valve, comprising chamber means having inlet and outlet ports and generally cylindrical face extent about at least one port, and stopper means movable in the chamber into and out of a position in which the stopper blanks said one port, and an assembly mounted on said face in said chamber and including an annulus of packing material for sealing off between the face and stopper when the stopper is in said position, said assembly including a one-piece ring spaced radially outwardly from said face and axially floatingly suspended on the packing annulus and entirely within the chamber, said ring and face forming therebetween an annular channel receiving the entirety of the packing annulus, and said assembly including a thrust member having an annular boss projecting into said channel within said ring toward said packing annulus, the portion of the thrust member outwardly of said boss being axially openly spaced from the ring to allow movement of the boss toward said packing annulus in all positions of the ring, said thrust member being simultaneously rotatable about said face and bodily movable relatively toward the packing in the channel to exert thrust tending to compress the packing annulus against said face, ring and stopper when the stopper is in said position, said ring having a lip projecting between a portion of the packing and the stopper so as to be carried by the packing into engagement with the stopper surface in response to thrust exertion by the thrust member, said ring cooperating with said thrust member, face and the stopper to confine the packing annulus against pressural extrusion from the channel when the packing annulus is thrust into sealing engagement with the stopper.

2. Actuating means for effecting movement of valve stopper means to port blanking position in a valve chamber and then effecting displacement of annular sealing means into pressure sealing engagement with the stopper and annular face extent of the valve chamber about a chamber port only when the stopper is in said position, said actuating means including driving and driven rotary parts through which force is transmissible with mechanical advantage from the driving to the driven parts for producing said movement, said driving part and one driven part having geared interconnection, said actuating means also including coupling means for coupling two driven parts to rotate forwardly together during said movement and operable to decouple said two driven parts in response to continued force transmission to one of said two driven parts after completion of said movement, means for camming said coupling means into coupling position between said two driven parts during reverse rotation of said two driven parts, said actuating means including an annular thrust member operable to transmit thrust for producing said displacement after completion of said movement.

3. Actuating means for effecting forward rotary movement of valve stopper means to port blanking position in a valve chamber and then effecting displacement of annular sealing means into pressure sealing engagement with the stopper and annular face extent of the valve chamber about a chamber port only when the stopper is in said position, said actuating means including driving and driven rotary parts through which force is transmissible with mechanical advantage so that the driven parts rotate at substantially slower angularly velocity than the driving parts for producing said forward movement, said driving part and one driven part having geared interconnection, said actuating means also including coupling means for coupling two driven parts to rotate forwardly together during said forward movement and operable to decouple the two driven parts in response to continued rotation of one of the two driven parts after completion of said forward movement, means for camming said coupling means into coupling position between said two driven parts during reverse rotation of said two driven parts, said two driven parts having a common axis of rotation, said actuating means including an annular thrust member operable to transmit thrust for producing said displacement after completion of said forward movement.

4. Actuating means for effecting forward rotary movement of valve stopper means to port blanking position in a valve chamber and then thrusting annular sealing means into pressure sealing engagement with the stopper and annular face extent of the valve chamber about a chamber port only when the stopper is in said position, and also for effecting reverse rotary movement of said valve stopper means from said position, said actuating means including driving and driven rotary parts through which force is transmissible with mechanical advantage for producing said forward movement, said driving part and one driven part having geared interconnection, said actuating means also including coupling means for coupling two driven parts to rotate forwardly together during said forward movement and operable to decouple the two driven parts in response to continued forward rotation of one of the two driven parts after completion of said forward movement, means for camming said coupling means into coupling position between said two driven parts during reverse rotation of said two driven parts, said two driven parts having a common axis of rotation, shoulder means carried by said driven parts and engageable in response to reverse rotation of said one driven parts for transmitting said reverse rotation through the other driven part for producing said reverse rotary movement, said actuating means including an annular thrust member operable to transmit thrust for producing said displacement after completion of said forward movement.

5. Actuator means for effecting forward rotary movement of valve stopper means to port blanking position in a valve chamber and then effecting displacement of annular sealing means into pressure sealing engagement with the stopper and annular face extent of the valve chamber about a chamber port only when the stopper is in said position, said actuating means including driving and driven rotary parts through which force is transmissible with mechanical advantage from the driving to the driven parts for producing said forward movement, two driven parts being coupled to rotate forwardly together during said forward movement and decoupled in response to continued force transmission to one of said two driven parts after completion of said forward movement, said actuating means including an annular thrust member operable to transmit thrust for producing said displacement after completion of said forward movement, said actuating means including lever means in the path of forward rotation of said one driven part to be displaced thereby only in response to continued forward rotation of said one driven part after decoupling of said driven parts for transmitting sufficient thrust acting through said thrust member to complete said displacement under conditions of continued thrust exertion.

6. Actuator means for effecting forward rotary movement of valve stopper means to port blanking position in a valve chamber and then thrusting annular sealing means into pressure sealing engagement with the stopper and annular face extent of the valve chamber about a chamber port only when the stopper is in said position, and also for effecting reverse rotary movement of said valve stopper means from said position, said actuating means including driving and driven rotary parts through which force is transmissible with mechanical advantage for producing said forward movement, said actuating means also including coupling means for coupling two driven parts to rotate together during said forward movement and operable to decouple the two driven parts in response to continued forward rotation of one of the two driven parts after completion of said forward movement, said two driven parts having a common axis of rotation, shoulder means carried by said driven parts and engageable in response to reverse rotation of said one driven part for producing said reverse rotary movement, said actuating means including an annular thrust member operable to transmit thrust for producing said displacement after completion of said forward movement, said actuating means including lever means in the path of forward rotation of said one driven part to be displaced thereby only in response to continued forward rotation of said one driven part after decoupling of said driven parts for transmitting sufficient thrust acting through said thrust member to complete said displacement under conditions of continued thrust exertion.

7. The invention as defined in claim 4 including stop means for blocking rotation of said other driven part when the said driven parts are decoupled.

8. The invention as defined in claim 4 in which said driving part and said one driven part comprise a worm drive.

9. The invention as defined in claim 6 in which said movable means includes cam means rotatable in response to said displacement of the lever and an annular thrust member annularly rotatable in response to rotation of said cam means, said thrust member extending about said one port and being bodily movable toward the sealing means in response to thrust member annular rotation for transmitting said thrust.

10. The invention as defined in claim 1 in which said stopper means comprises a ball having a passage therethrough rotatable into and out of registration with said ports, said ball being engageable by said ring about said passage, said ring having an annular concave spherical surface movable into close fitting engagement with the stopper spherical surface extent.

11. The invention as defined in claim 1 including spring means transmitting thrust acting continuously upon and through said thrust member to urge said packing annulus into relatively light pressural engagement with said stopper means.

References Cited in the file of this patent

UNITED STATES PATENTS

| | | |
|---|---|---|
| 2,734,715 | Knox | Feb. 14, 1956 |
| 2,795,960 | Heinen | June 18, 1957 |
| 2,858,097 | Blomstran | Oct. 28, 1958 |
| 2,863,629 | Knox | Dec. 9, 1958 |
| 2,872,155 | Hazard | Feb. 3, 1959 |
| 2,952,437 | Knox | Sept. 13, 1960 |